Nov. 28, 1944.    M. CHERNEY    2,363,642
DECIMAL POINT INDICATING MECHANISM FOR SLIDE RULE COMPUTATIONS
Filed May 20, 1944    2 Sheets—Sheet 1
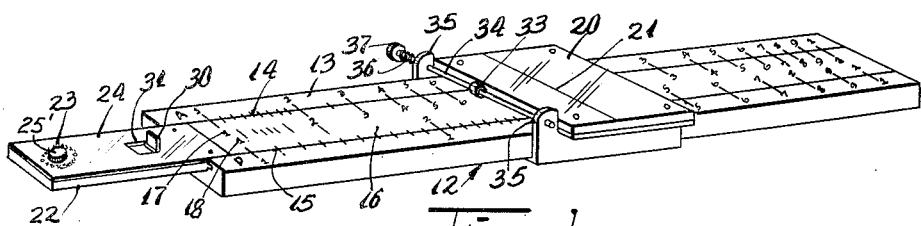
Fig-1-
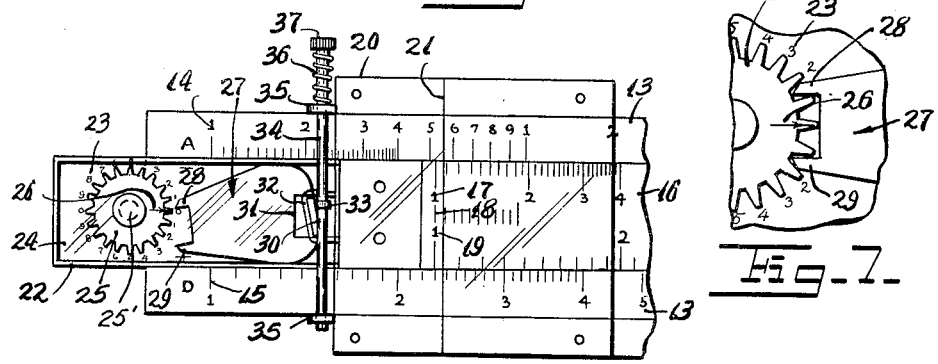
Fig-5-
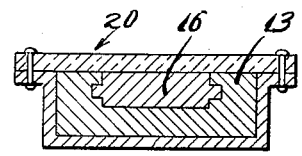
Fig-7-
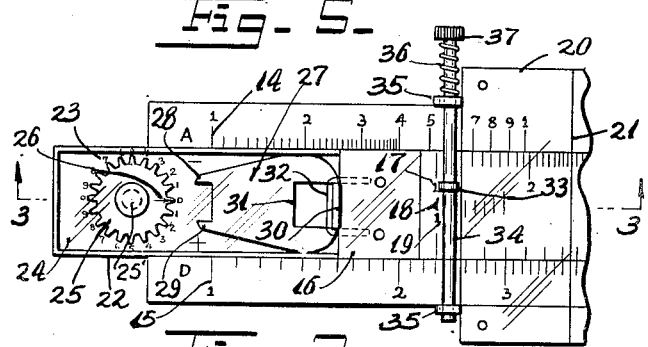
Fig-2-
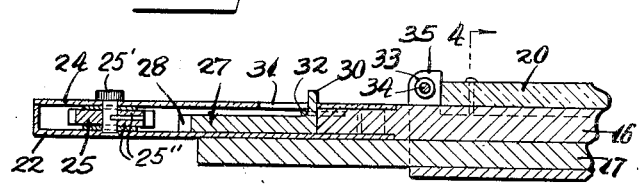
Fig-3-
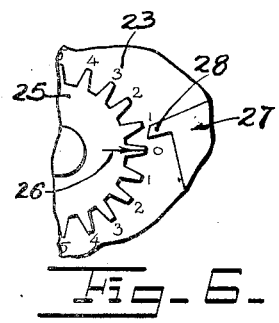
Fig-4-
Fig-6-
INVENTOR.
Michael Cherney
BY
Zottau Holechek
ATTORNEY Nov. 28, 1944.    M. CHERNEY    2,363,642
DECIMAL POINT INDICATING MECHANISM FOR SLIDE RULE COMPUTATIONS
Filed May 20, 1944    2 Sheets-Sheet 2

INVENTOR.
Michael Cherney
BY
ATTORNEY

Patented Nov. 28, 1944

2,363,642

UNITED STATES PATENT OFFICE 2,363,642

DECIMAL POINT INDICATING MECHANISM FOR SLIDE RULE COMPUTATIONS

Michael Cherney, New York, N. Y.

Application May 20, 1944, Serial No. 536,445

8 Claims. (Cl. 235—64.3)

This invention relates to new and useful improvements in slide rules, and has more particular reference to a decimal attachment for slide rules by which it is relatively simple to keep track of the decimal point of a problem being worked on the slide rule.

It is needless to explain the operation of a slide rule in this specification as that is well known. We know there are certain rules for assisting in locating the decimal point of an answer. Generally these rules note the number of times that the slide projects from one side of the stock of the slide rule during the working of a problem.

This invention particularly proposes a simple mechanism mounted upon the slide rule and arranged to automatically count the number of times that the slide projects from the side of the stock of the slide rule. An arrangement is also proposed whereby by a slight manipulation, the counting device subtracts or cancels digits of the characteristic of the problem, since this is sometimes required in working a problem.

The new and improved attachment is characterized by a casing for mounting on the slide and provided with an arcuate digit scale. A ratchet wheel is rotatively mounted in the casing concentric with the digit scale and has an indicator for moving along said digit scale. It is proposed to use a two prong pawl slidably mounted in the casing for turning said ratchet wheel counterclockwise when the pawl is tilted above a neutral position, and clockwise when the pawl is tilted below said neutral position, and it is proposed that said pawl have an operator finger projecting through an opening in the casing by which its position in relation to the neutral position may be controlled. The pawl is also moved by this projecting finger.

The invention contemplates the provision of resilient means for urging the pawl rearwards so that it is ready to be moved forwards when the runner with the hairline is moved to coincide with one of the indexes of the slide of the slide rule. A certain abutment is proposed for engaging the finger of said pawl for moving the pawl against the ratchet wheel to turn same when said index of said slide is aligned with the hairline of the runner. It is also proposed to adjustably mount said abutment so that it may engage one edge or the other edge of the finger for tilting the pawl above or below the neutral position to control the direction of turning of said ratchet.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a perspective view of a slide rule provided with a decimal attachment constructed in accordance with this invention.

Fig. 2 is a fragmentary enlarged plan view of a portion of Fig. 1.

Fig. 3 is a sectional view taken on the line 3—3 of Fig. 2.

Fig. 4 is a transverse sectional view taken on the line 4—4 of Fig. 3.

Fig. 5 is an elevational view similar to Fig. 2 but illustrating the parts in a different position.

Fig. 6 is an enlarged detailed view of a portion of Fig. 5.

Fig. 7 is another view similar to Fig. 5 but showing the parts in a later position.

Figure 8:
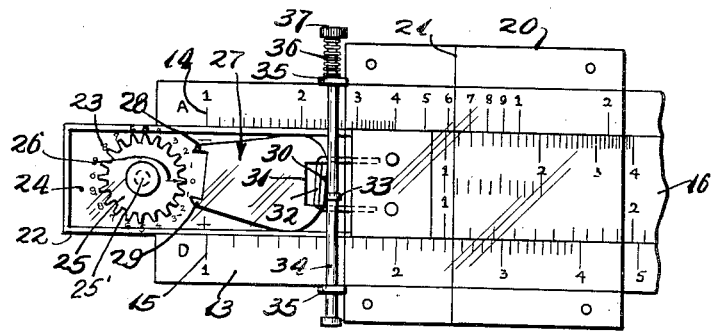
Fig. 8 is a view similar to Fig. 5 but showing the parts in another position.

The decimal attachment for slide rules, according to that form of the invention disclosed in Figs. 1-8 inclusive, is used in conjunction with a slide rule 12 having a stock 13 with the usual scales 14 and 15, a slide 16 with the usual scales 17, 18, 19, etc., and a runner 20 with the usual hairline 21. The ends of the scales we shall hereinafter refer to as the end indexes. The slide rule illustrated on the drawings is standard in all respects.

The decimal attachment includes a casing 22 mounted upon the slide 16 and provided with an arcuate digit scale 23. A ratchet wheel 25 is rotatively mounted within said casing 22 coaxially of said scale 23. Friction washers 25″ engage the faces of said ratchet wheel 25 to hold it from turning too freely. This ratchet wheel 25 is provided with an indicator 26, such as a pointer imprinted on the ratchet wheel for moving along said digit scale 23. Said ratchet wheel is provided with a knob 25′ by which it may be manually turned. In this connection it should be stated that the indicator is provided with two sets of scales namely right and left, to the neutral axis of the dial and designated with negative and positive signs.

A pawl 27 having two prongs, indicated by numerals 28 and 29, is slidably mounted in the casing 22 and is for the purpose of turning the ratchet wheel 25 clockwise or counterclockwise in steps of one tooth. The pawl 27 is so constructed that when tilted above a neutral position it will turn the ratchet wheel 25 in one direction, and when tilted below will turn it in the other direction. The pawl 27 has an operator finger 30 projecting through an opening 31 in the top wall 24 of the casing 22.

Resilient means urge the pawl 27 rearwards. This resilient means is shown as an elastic band 32 engaged around the finger 30 and having its ends attached to the slide 16. Not only does the elastic band 32 hold the pawl 27 rearwards, but it also holds it in a neutral position, as illustrated in Fig. 2, by engaging the finger 30 against the back edge of the opening 31. Of course, holding the pawl in a neutral position at this point is merely a matter of design since the elastic band 32 and the cooperative rear edge of the opening 31 could readily hold the pawl in its up or down position and the device will operate similarly.

An abutment 33 is provided for engaging the finger 30 for moving the pawl 27 against the ratchet wheel 25 to turn the ratchet wheel 25 when an index of said slide 16 is aligned with the hairline of said runner 20. This abutment 33 is connected with the runner 20. More particularly, it is in the nature of a washer frictionally engaged on a stem 34 which is mounted across lugs 35 formed on the runner 20. The stem 34 is adjustably mounted so that the abutment 33 is adjustable in relation to the finger 30 for engaging one edge or the other edge of the finger for tilting the pawl 27 above or below the neutral position to control the direction of turning of the ratchet 25. More specifically, the stem 34 is urged in one direction by a coaxial spring 36 mounted on the stem and acting between one of the lugs 35 and a head 37 formed on one end of the stem 34.

The operation of the device is as follows:

When the abutment 33 is free of the finger 30 the pawl 27 will assume a neutral position, as illustrated in Fig. 2. When we move the slide 16 relative to the runner 20 to align an end index of the scales on the slide 16 with the hairline 21 on the runner, the finger 30 will engage the abutment 33 and be moved forwards by the abutment. Initial engagement of the finger 30 with the abutment 33 controls the tilt of the pawl 27. As illustrated in Fig. 2, the abutment 33 will hit the top edge of the finger 30 which will pivot the pawl 27 downwards to a position as illustrated in Fig. 5. Now when the slide 16 is moved so that the index will align with the hairline 21, the finger 30 is forced forwards in the opening 31 and the prong 29 of the pawl 27 will engage against one of the sides of one of the teeth of the ratchet wheel 25 (see particularly Fig. 6) to turn the ratchet 25 counterclockwise one tooth. The ratchet 25 will turn one tooth only, because as it turns it lifts the pawl 27 so that the prong 29 engages between a pair of the teeth of the ratchet 25, locking the ratchet against further turning, as illustrated in Fig. 7.

The nature of the problem whether multiplication or division will determine the movement of the pawl 27 merely by virtue of the fact that in multiplication the pawl 27 is carried to the runner 20 without actuating the abutment 33 manually.

While in division, the operator slides the runner 20 to the pawl 27 by pressing the abutment 33 simultaneously.

When the operator uses the device for division, first he slides the runner 20 to the index by pressing the button on the abutment 33 and depresses the handle 37 so that its end index aligns with the hairline 21. When the handle 37 is depressed the abutment 33 will engage the bottom edge of the finger 30, see Fig. 8, so that the pawl 27 is tilted upwards and now the bottom prong 29 will first engage the side of one of the teeth of the ratchet 25 for turning the ratchet clockwise. As it turns clockwise the pawl 27 will be moved downwards and the prong 28 will engage in between the teeth of the ratchet 25 for locking it against further turning.

From the above description it will be readily seen that the characteristic indicator can add or subtract, and in this way keep accurate count of the characteristic of an answer to a problem.

The dial on top of the case indicates part of the characteristic numbers of the problem and it should be designated by algebraic sign so as to enable the operator to add or subtract same from rest of the characteristic numbers in the problem.

Figure 9:
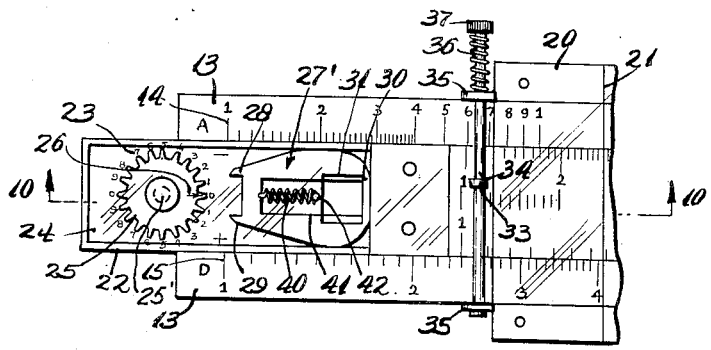
Fig. 9 is a fragmentary plan view of a slide rule with a decimal attachment constructed in accordance with a modified form of this invention.
Figure 10:
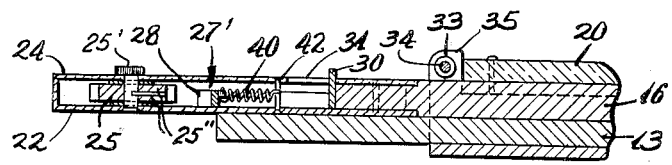
Fig. 10 is a sectional view taken on the line 10—10 of Fig. 9.

In Figs. 9 and 10 a modified form of the invention is shown which is substantially identical to the prior form, distinguishing in the construction of the pawl 27'. This pawl 27' is urged into a neutral or initial position by a spring 40. The pawl 27' is formed with a cutout area 41 in which the spring 40 operates. One end of the spring 40 is connected with the pawl 27' and the other end is connected with a pin 42 mounted through the casing 22. The spring 40 urges the pawl 27' rearwards into its neutral or initial position. The spring 40 extends along the neutral line of the pawl 27' and consequently when the pawl 27' is shifted down the spring tends to keep it down.

In other respects this form of the invention is similar to that previously shown and like reference numerals identify like parts in each of the several views.

It is to be understood that this device may also be attached to the stock of the slide rule instead of the tongue, to increase the reading dial of the device.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In combination with a slide rule having a stock with scales, a slide with scales having end indexes, and a runner with a hair line, a casing mounted on said slide and provided with an arcuate digit scale, a ratchet wheel rotatively mounted in said casing concentric of said digit scale and having an indicator for moving along said digit scale, a two prong pawl slidably mounted in said casing for turning said ratchet in one direction when tilted above a neutral position and in the other direction when tilted below said neutral position and having an operator finger projecting through an opening in said casing, resilient means for urging said pawl rearwards, an abutment for engaging said finger for moving said pawl against said ratchet wheel to turn same when an end index of said slide is aligned with the hair line of said runner and said abutment being adjustably mounted on said runner for engaging one edge or the other edge of said finger for tilting said pawl above or below said neutral position to control the direction of turning of said ratchet.

2. In combination with a slide rule having a stock with scales, a slide with scales having end indexes, and a runner with a hair line, a casing mounted on said slide and provided with an arcuate digit scale, a ratchet wheel rotatively mounted in said casing concentric of said digit scale and having an indicator for moving along said digit scale, a two prong pawl slidably mounted in said casing for turning said ratchet in one direction when tilted above a neutral position and in the other direction when tilted below said neutral position and having an operator finger projecting through an opening in said casing, resilient means for urging said pawl rearwards, an abutment for engaging said finger for moving said pawl against said ratchet wheel to turn same when an end index of said slide is aligned with the hair line of said runner and said abutment being adjustably mounted on said finger for tilting said pawl above or below said neutral position to control the direction of turning of said ratchet, said casing having a top wall of transparent material, said digit scale being imprinted on said top wall, and the indicator on the ratchet wheel being visible through the top wall and may be seen beneath said digit scale.

3. In combination with a slide rule having a stock with scales, a slide with scales having end indexes, and a runner with a hair line, a casing mounted on said slide and provided with an arcuate digit scale, a ratchet wheel rotatively mounted in said casing concentric of said digit scale and having an indicator for moving along said digit scale, a two prong pawl slidably mounted in said casing for turning said ratchet in one direction when tilted above a neutral position and when tilted below said neutral position and having an operator finger projecting through an opening in said casing, resilient means for urging said pawl rearwards, an abutment for engaging said finger for moving said pawl against said ratchet wheel to turn same when an end index of said slide is aligned with the hair line of said runner and said abutment being adjustably mounted on said runner for engaging one edge or the other edge of said finger for tilting said pawl above or below said neutral position to control the direction of turning of said ratchet, said casing having a top wall of transparent material, said digit scale being imprinted on said top wall, and the indicator on the ratchet wheel being visible through the top wall and may be seen beneath said digit scale, said indicator being a mark on the ratchet wheel.

4. In combination with a slide rule having a stock with scales, a slide with scales having end indexes, and a runner with a hair line, a casing mounted on said slide and provided with an arcuate digit scale, a ratchet wheel rotatively mounted in said casing concentric of said digit scale and having an indicator for moving along said digit scale, a two prong pawl slidably mounted in said casing for turning said ratchet in one direction when tilted above a neutral position and in the other direction when tilted below said neutral position and having an operator finger projecting through an opening in said casing, resilient means for urging said pawl rearwards, an abutment for engaging said finger for moving said pawl against said ratchet wheel to turn same when an end index of said slide is aligned with the hair line of said runner and said abutment being adjustably mounted on said runner for engaging one edge or the other edge of said finger for tilting said pawl above or below said neutral position to control the direction of turning of said ratchet, while one of said prongs of the pawl turns the ratchet wheel, the other locks the ratchet wheel against turning more than one tooth.

5. In combination with a slide rule having a stock with scales, a slide with scales having end indexes, and a runner with a hair line, a casing mounted on said slide and provided with an arcuate digit scale, a ratchet wheel rotatively mounted in said casing concentric of said digit scale and having an indicator for moving along said digit scale, a two prong pawl slidably mounted in said casing for turning said ratchet in one direction when tilted above a neutral position and in the other direction when tilted below said neutral position and having an operator finger projecting through an opening in said casing, a resilient means for urging said pawl rearwards, an abutment for engaging said finger for moving said pawl against said ratchet wheel to turn same when an end index of said slide is aligned with the hair line of said runner and said abutment being on said runner for engaging one edge or the other edge of said finger for tilting said pawl above or below said neutral position to control the direction of turning of said ratchet, said resilient means comprising an elastic loop around said finger and urging the finger against the rear edge of the opening in said casing.

6. In combination with a slide rule having a stock with scales, a slide with scales having end indexes, and a runner with a hair line, a casing mounted on said slide and provided with an arcuate digit scale, a ratchet wheel rotatively mounted in said casing concentric of said digit scale and having an indicator for moving along said digit scale, a two prong pawl slidably mounted in said casing for turning said ratchet in one direction when tilted above a neutral position and in the other direction when tilted below said neutral position and having an operator finger projecting through an opening in said casing, resilient means for urging said pawl rearwards, an abutment for engaging said finger for moving said pawl against said ratchet wheel to turn same when an end index of said slide is aligned with the hair line of said runner and said abutment being adjustably mounted on said runner for engaging one edge or the other edge of said finger for tilting said pawl above or below said neutral position to control the direction of turning of said ratchet, a stem slidably mounted on said runner, resilient means urging said stem into an initial position, and said abutment being mounted upon said stem and being adjustable because said stem may be moved out of said initial position.

7. In combination with a slide rule having a stock with scales, a slide with scales having end indexes, and a runner with a hair line, a casing mounted on said slide and provided with an arcuate digit scale, a ratchet wheel rotatively mounted in said casing concentric of said digit scale and having an indicator for moving along said digit scale, a two prong pawl slidably mounted in said casing for turning said ratchet in one direction when tilted above a neutral position and in the other direction when tilted below said neutral position and having an operator finger projecting through an opening in said casing, resilient means for urging said pawl rearwards, an abutment for engaging said finger for moving said pawl against said ratchet wheel to turn same when an end index of said slide is aligned with the hair line of said runner and said abutment being adjustably mounted on said runner for engaging one edge or the other edge of said finger for tilting said pawl above or below said neutral position to control the direction of turning of said ratchet, a stem slidably mounted on said runner, resilient means urging said stem into an initial position, and said abutment being mounted upon said stem and being adjustable because said stem may be moved out of said initial position, said stem being provided with a head by which it may be conveniently moved.

8. In combination with a slide rule having a stock with scales, a slide with scales having end indexes, and a runner with a hair line, a casing mounted on said slide and provided with an arcuate digit scale, a ratchet wheel rotatively mounted in said casing concentric of said digit scale and having an indicator for moving along said digit scale, a two prong pawl slidably mounted in said casing for turning said ratchet in one direction when tilted above a neutral position and in the other direction when tilted below said neutral position and having an operator finger projecting through an opening in said casing, resilient means for urging said pawl rearwards, an abutment for engaging said finger for moving said pawl against said ratchet wheel to turn same when an end index of said slide is aligned with the hair line of said runner and said abutment being adjustably mounted on said runner for engaging one edge or the other edge of said finger for tilting said pawl above or below said neutral position to control the direction of turning of said ratchet, said resilient means comprising a spring acting between said pawl and said casing.

MICHAEL CHERNEY.